United States Patent
Scherm et al.

[15] 3,705,194
[45] Dec. 5, 1972

[54] AMINOADAMANTANE DERIVATIVES AND METHOD FOR THEIR PRODUCTION

[72] Inventors: Arthur Scherm, Bad Homburg; Dezso Peteri, Frankfurt am Main, both of Germany

[73] Assignee: Merz & Co., Chemische Fabrik, Frankfurt-am-Main, Germany

[22] Filed: Aug. 11, 1970

[21] Appl. No.: 63,018

[30] Foreign Application Priority Data

Aug. 13, 1969 Germany..........P 19 41 218.1

[52] U.S. Cl. ...260/561 A, 260/268 PC, 260/247.2 A, 260/293.86, 260/326.85, 424/248, 424/250, 424/267, 424/274, 424/320

[51] Int. Cl..............................................C07c 103/00

[58] Field of Search........260/561 A, 293.86, 326.85, 260/268 PC, 247.2 A

Primary Examiner—Lewis Gotts
Assistant Examiner—Ethel G. Love
Attorney—Gordon W. Hueschen and Talivaldis Cepuritis

[57] ABSTRACT

N-substituted 1-aminoadamantanes are prepared by reacting an 1-aminoadamantane with a haloacetyl halide and further reacting the resulting reaction product with an alkaline salt of amino-ethanol. The prepared compounds possess excellent virostatic properties.

4 Claims, No Drawings

AMINOADAMANTANE DERIVATIVES AND METHOD FOR THEIR PRODUCTION

BACKGROUND OF THE INVENTION

According to British patents No. 1,006,885 and No. 1,063,366, 1-aminoadamantanes and several of their derivatives are known, which have valuable pharmaceutical characteristics.

SUMMARY OF THE INVENTION

Now it has been found surprisingly that derivatives of 1-aminoadamantane of the general formula

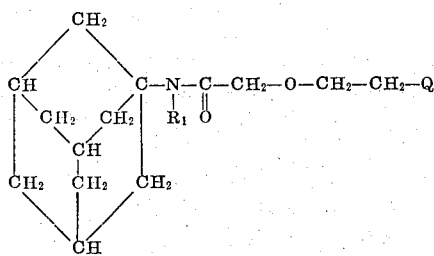

possess excellent virostatic characteristics. In the above formula $R_1$ can be hydrogen or a lower alkyl containing one to three carbon atoms such as methyl, ethyl, propyl and isopropyl. Q can be an amino group represented by the formula

where $R_2$ and $R_3$ can be alike or different and are selected from the group consisting of hydrogen and lower alkyl containing one to three carbon atoms, inclusive; or a cyclical amino group represented by the formula

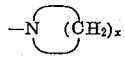

where x is an integer having a value of 2 to 5, inclusive, such as 1-pyrrolidinyl, piperidino, dimethyleneimino, and trimethyl-eneimino; or heterocyclic amino represented by the formula

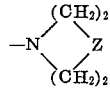

where ζ can be oxygen or nitrogen, i.e., piperazino and morpholino.

Both the bases as well as their pharmaceutically acceptable acid addition salts, mainly hydrohalides in a suitable form for pharmaceutical application, such as ointments, injections, eye drops, tablets, in coated form, etc., are used.

The invention relates, furthermore, to a process for the production of these new compounds. The process is characterized in that a 1-aminoadamantane or an aminoadamantane simply substituted on nitrogen is reacted with a haloacetyl halide, preferably with chloracetyl chloride, and the haloacetyl aminoadamantane obtained is allowed to react with an alkaline salt of an aminoethanol in the presence of an inert solvent.

DESCRIPTION OF THE PREFERRED EMBODIMENTS

The manufacture of this new class of the 1-aminoadamantanes is accomplished according to the following examples:

EXAMPLE 1

N-(2-dimethylamino ethoxy)-acetyl-aminoadamantane(1)-hydrochloride (Substance D 41)

a. Chloracetylaminoadamantane 60.4 g (0.4 mole) aminoadamantane are suspended in 400 ml benzine in a 1 liter three-necked flask provided with stirrer and reflux cooler and 22.5 g (0.2 mole) chloracetyl chloride is added for suspension while stirring.

Subsequently this is heated for 10 hours under reflux, an additional 5 g chloracetyl chloride is added to the mixture and this is finally heated for another 10 hours under reflux.

Now the aminoadamantane hydrochloride (42 g) is removed and the solvent is completely removed from the filtrate. 38.2 g (85 percent of the theory) of chloroacetylaminoadamantane is obtained as residue. After determination of the nitrogen, the substance is 98 percent.

b. N-(2-dimethylaminoethoxy)-acetyl-aminoadamantane(1)-hydrochloride 2.3 g Na (0.1 g-atom) were dissolved in 75 ml dimethylamino-ethanol. Afterwards the excess alcohol was distilled off completely and the sodium salt developed is dried in a vacuum.

After drying, the salt is dissolved in about 200 ml xylene. To this solution, 22.8 g (0.1 mole) chloroacetylaminoadamantane are added, it is heated for 10 hours under reflux in a 250 ml round-bottomed flask with a reflux cooler, and the sodium chloride developed is subsequently filtered off. Now the xylene is distilled away, the liquid residue is dissolved in about 80 ml carbon tetrachloride and the hydrochloride is precipitated through introduction of hydrochloric acid gas.

The hydrochloride is dissolved in about 100 ml acetone and the solvent is subsequently distilled away, whereby excess hydrochloric acid passes over with it.

This operation is repeated until no excess acid is present.

A large excess of petroleum ether is added in a 500 ml three-necked flask provided with a stirrer and reflux cooler, to a concentrated acetonic solution of the hydrochloride and is stirred for at least one hour, whereby the desired substance is deposited in a crystalline form. Finally, the substance is filtered away and is dried in a desiccator.

14 Grams of the substance (15 percent of theory) are obtained.

After determination of the chloride with mercury-II-nitrate, the substance is 99 percent.

EXAMPLE 2

N-(2-dimethylaminoethoxy)-acetyl-N-methyl-aminoadamantane(1)-hydrochloride (Substance D 65)

a. N-(chloroacetyl)-N-methyl-aminoadamantane 17.2 g (0.085 mole) N-methylaminoadamantane hydrochloride is dissolved in 50 ml water. It is mixed with a small excess of solid soda lye and the solution is etherized out. After distilling the solvent off, one will obtain 12.5 g (0.075 mole) N-methylaminoadamantane. The base is suspended in 100 ml benzine in a 250 ml three-necked flask provided with stirrer and reflux cooler. 4.5 g (0.04 mole) chloroacetyl chloride is added to this suspension and subsequently is heated for 20 hours under reflux. After that 1 g more chloroacetyl chloride is added and heated for an additional 5 hours under reflux.

Now the N-methyl-amino-adamantane hydrochloride, which is insoluble in benzine, is filtered off, the benzine is distilled away from the organic phase and the solvent residue is removed in the desiccator.

The residue solidifies slowly and is dried on a clay plate.

12.6 g (68.4 of theory) N-chloroacetyl-N-methylaminoadamantane are obtained.

After determination of the nitrogen, the substance is 100 percent.

b. N-(2-dimethylaminoethoxy)-acetyl-N-methyl-amino-adamantane(1)-hydrochloride.

2.2 g (0.02 mole) Na-dimethyl-aminoethylate (produced as under 1 b) is suspended in 100 ml toluene in a 250 ml round-bottomed flask, 4.8 g (0.02 mole) N-(chloroacetyl)-N-methyl-amino-adamantane is added to the suspension and heated for 10 hours under reflux.

Subsequently the sodium chloride developed as well as the unconverted alcohol are filtered off or removed, the toluene is distilled away from the filtrate up to about 50 ml, is washed twice with 50 ml $H_2O$ and dried over sodium sulfate. HCl gas is introduced into the dried solution. Then the solvent is completely distilled away. A solid residue is obtained which is treated with acetone as in 1 b and is dried.

The yield amounts to 3 g (52 percent of theory). After determination of the chloride, the substance is 100.5 percent.

EXAMPLE 3

N-(2-methylaminoethoxy)-acetyl-aminoadamantane(1)-hydrochloride (Substance D 62)

The Na-methylaminoethylate (produced as in 1b) obtained from 0.460 g (0.02 g-atom) Na and 10 ml 2-methylaminoethanol are dissolved in 40 ml xylene and 4.54 g (0.02 mole) chloroacetyl aminoadamantane are added to this solution in a 100 ml round-bottomed flask.

Now this is heated for 10 hours under reflux, the sodium chloride developed is subsequently filtered off and the solvent is filtered from the filtrate.

The liquid residue is received in 20 ml carbon tetrachloride and HCl gas is introduced in the solution. The greasy hydrochloride obtained becomes solid in the refrigerator. The salt is sucked away, the substance is washed with acetic ester and it is dried in the vacuum desiccator over phosphorous pentoxide and solid potassium hydroxide.

The yield amounts to 2.6 g (40 percent theory).

After determination of chloride, the substance is 101 percent.

EXAMPLE 4

N-(2-methylaminoethoxy)-acetyl-N-methyl-aminoadamantane(1)-hydrochloride (Substance D 63)

Na-methylaminoethylate, obtained from 0.460 g (0.02 g-atom) Na and 10 ml 2-methyl-aminoethanol (production as in 1b), is dissolved in 40 ml toluene while heating. 4.8 g (0.02 mole) N-(chloroacetyl)-N-methyl-aminoadamantane is added to this solution and is boiled for 10 hours under reflux. Subsequently the sodium chloride developed is filtered off and the organic solution is washed twice with 30 ml water for removal of the unconverted alcoholate. After drying over sodium sulfate, HCl gas is introduced by to saturation.

This is allowed to cool in the refrigerator, the toluene phase is decanted from the oil that developed and the substance is treated with acetone as in 1 b. The toluene phase is distilled and the residue is processed just like the oil.

After drying over phosphorous pentoxide and KOH, one will obtain 2.9 g (51.3 percent of theory) of a light powder.

After determination of the chloride, the substance is 98.9 percent.

EXAMPLE 5

N-(2-morpholinethoxy)-acetyl-aminoadamantan(1)-hydrochloride (Substance D 64)

0.460 g (0.02 g-atom) Na is dissolved while heating in 20 ml morpholinethanol and one proceeds further as in 1 b. The sodium salt is suspended in 40 ml xylene and is mixed with 4.54 g (0.02 mole) N-(chloroacetyl)-aminoadamantane in 10 ml xylene.

Subsequently this is heated for 8 hours under reflux, then the xylene is distilled off up to 10 ml and HCl gas is introduced.

Now the xylene is completely distilled off, the residue is treated with acetone as in 1 b and subsequently it is dried in the desiccator over phosphorous pentoxide and potassium hydroxide in a vacuum.

3.1 g (49.3 percent of theory) of product is obtained.

After determination of chloride, the substance is 100.3 percent.

The virological examination of the compounds produced in the manner just described was undertaken with the plaque test method. In the case of the plaque test, the substance to be examined is checked in tissue cultures with regard to the types of virus, vaccines, influenza, parainfluenza and herpes. A certain quantity of dissolved substance is dripped onto a small sheet of filter paper and after causing cloudiness the therapeutically effective zone is determined. The tissue cultures were chicken fibroplasts, for parainfluenza a monkey kidney cell strain and for the herpes virus there were human amnion cells. Results:

| Substance used | Quantity in mcg | Hemmhof, Diameters in mm |
|---|---|---|
| Testing in regard to parainfluenza virus | | |
| D 65 | 200 | 45 |
| D 62 | 200 | 30 |
| D 63 | 200 | 30 |
| D 64 | 200 | 27 |
| Testing with regard to vaccine virus | | |
| D 41 | 200 | 45 |
| D 65 | 200 | 25 |
| D '0 | 0)) | 0% |
| D 63 | 200 | 33 |

Testing against influenza virus
| | | |
|---|---|---|
| D 41 | 200 | 40 |
| D 65 | 200 | 40 |
| D 62 | 200 | 33 |
| D 63 | 200 | 35 |

Testing against herpes virus
| | | |
|---|---|---|
| D 41 | 200 | 30 |
| D 65 | 100 | 17 |

We claim:

1. Aminoadamantane compounds of the general formula:

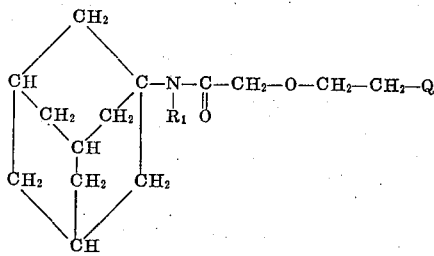

wherein $R_1$ is a member of the group consisting of hydrogen and lower alkyl containing one to three carbon atoms, inclusive, and Q is a member of the group consisting of amino represented by the formula

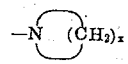

where $R_2$ and $R_3$ are selected from the group consisting of hydrogen and lower alkyl containing one to three carbon atoms, inclusive, cyclical amino represented by the formula $$-N\underbrace{\quad}(CH_2)_x$$

where x is an integer having a value of 2 to 5, inclusive and heterocyclical amino represented by the formula

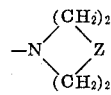

where Z is selected from the group consisting of nitrogen and oxygen;

and the corresponding salts thereof.

2. The hydrochloride of an aminoadamantane compound according to claim 1, wherein $R_1$ signifies a hydrogen atom and $R_2$ and $R_3$ methyl radicals.

3. The hydrochloride of an aminoadamantane compound according to claim 1, whereby $R_1$, $R_2$ and $R_3$ signify methyl radicals.

4. Process for the production of an aminoadamantane according to claim 1, characterized in that 1-aminoadamantane or N-alkylaminoadamantane is reacted with haloacetyl halide and the obtained haloacetyl aminoadamantane is reacted with an alkali salt of an aminoethanol in the presence of an inert solvent.

* * * * *